United States Patent [19]

Kanda

[11] Patent Number: 5,334,039

[45] Date of Patent: Aug. 2, 1994

[54] WATERPROOF CONNECTOR HOUSING AND METHOD OF PRODUCING THE SAME

[75] Inventor: Masahiro Kanda, Shizuoka, Japan

[73] Assignee: Yazaki Corp., Tokyo, Japan

[21] Appl. No.: 922,730

[22] Filed: Jul. 31, 1992

[30] Foreign Application Priority Data

Aug. 14, 1991 [JP] Japan ................... 3-204221
Aug. 14, 1991 [JP] Japan ................... 3-204222

[51] Int. Cl.⁵ ............. B29C 39/10; B29K 83/00; B29L 31/36; H01R 13/52
[52] U.S. Cl. ................. 439/271; 264/135; 264/267; 264/273; 264/236; 439/284
[58] Field of Search .......... 264/135, 265, 267, 273, 264/274, 236; 439/271, 284

[56] References Cited

U.S. PATENT DOCUMENTS

| | | | |
|---|---|---|---|
| 2,661,500 | 12/1953 | Seymour et al. | 264/135 |
| 3,525,786 | 8/1970 | Meyn | 264/135 |
| 3,861,646 | 1/1975 | Douglas | 264/267 |
| 4,064,313 | 12/1977 | Takiguchi et al. | 156/329 |
| 4,122,127 | 10/1978 | Mikami et al. | 156/329 |
| 4,842,540 | 6/1989 | Endo et al. | 439/271 |
| 4,917,620 | 4/1990 | Samejima et al. | 439/271 |
| 5,108,303 | 4/1992 | Maeda et al. | 439/271 |
| 5,158,391 | 10/1992 | Fujitani et al. | 439/271 |

*Primary Examiner*—Jay H. Woo
*Assistant Examiner*—Robert B. Davis
*Attorney, Agent, or Firm*—Armstrong, Westerman, Hattori, McLeland & Naughton

[57] ABSTRACT

The present invention relates to a connector housing and a method of manufacturing the waterproof connector housing. The waterproof connector housing according to the present invention includes: an engagement frame for receiving a mating connector at a front portion thereof; a ring-like primer layer formed on a wall of at least an engagement face of the engagement frame; and addition-reaction fluid silicone rubber formed on the ring-like primer layer, wherein the addition-reaction fluid silicone rubber is combined with the primer layer by vulcanizing the fluid silicone rubber such that a ring-like packing is integrally formed with the connector housing. The method of manufacturing the waterproof connector housing includes the steps of: manufacturing a connector housing having an engagement frame for receiving a mating connector at a front portion thereof; attaching a primer layer to a wall of an engagement face of the engagement frame; drying the primer to form a ring-like primer layer; putting the connector housing with the primer layer between a male metal mold and a female metal mold having an opening; injecting fluid silicone rubber into the opening of the female metal mold; vulcanizing the fluid silicone rubber to form a ring-like packing in the opening; and removing the male and female metal molds to take out a molded product in which the ring-like packing is integrally formed with the connector housing.

33 Claims, 4 Drawing Sheets

WATERPROOF CONNECTOR HOUSING AND METHOD OF PRODUCING THE SAME

BACKGROUND OF THE INVENTION

1. Field of the Invention

The present invention relates to a connector housing for connecting a male connector and a female connector with each other with a waterproof seal therebetween and a method of manufacturing the waterproof connector housing.

2. Description of the Prior Art

In general, a ring-like packing is used as a separate part for sealing an engagement face between a male connector and a female connector. However, the work for attaching the packing to the engagement face is worrisome and the packing is liable to fall off. To eliminate these drawbacks, it is disclosed in Japanese Patent Application Laid-Open Showa 63-221568 that a ring-like packing c is integrally formed on an inner wall of a housing of a female connector as illustrated in FIG. 5, or, the ring-like packing may be formed integrally in double housings e of the male connector d as illustrated in FIG. 6. Further, in order to improve the waterproofness of the packing, a sticky material is added to a rubber material to give the packing c and c' stickiness. However, when the rubber material has stickiness, it also sticks to a metal mold. Even though surface treatment such as fluorine coating is applied to the metal mold to avoid the problem, the durability of the coating is not sufficient so that there is a difficulty in putting the method into practical use.

Further, it is disclosed in the patent application described above that fluid silicone rubber is used as material for the packing c and c'.

When synthetic rubber other than the silicone rubber is used as material for the packing, a vulcanizing agent such as sulfur, organic peroxide or the like is added for vulcanization. As a result, secondary products of the reaction are volatilized, causing electric contacts to be polluted. On the other hand, when addition-reaction silicone rubber is used, the secondary products described above are not generated, but, cyclicsiloxane remains in the fluid silicone rubber, which also causes the electric contacts to be polluted as described above. Therefore, to avoid the problem, a waterproof rubber stopper or a ring-like packing as a separate part is attached to a housing after those parts are secondarily vulcanized at 200° C. or 2 hours. However, when the packing is integrally formed with the housing, the secondary vulcanization cannot be applied due to the deformation of the housing. That is, there is a problem in which when the packing is integrally formed with the housing according to predetermined vulcanizing time, injection pressure, and temperature of metal mold for vulcanizing the rubber, the housing deforms or burrs are generated on the packing form attached to the housing since the housing is made of unreinforced thermoplastic resin such as PBT, 6-nylon and 6,6-nylon.

SUMMARY OF THE INVENTION

The present invention has been accomplished to eliminate the above drawbacks and an object of the present invention is to provide a connector housing in which a ring-like packing is integrally formed with the housing with high molding accuracy, and another object is to provide a method of manufacturing the waterproof connector housing with the ring-like packing with ease.

That is, the waterproof connector housing according to an embodiment of the present invention comprises: an engagement frame for receiving a mating connector at a front portion thereof; a ring-like primer layer formed on a wall of at least an engagement face of the engagement frame; and addition-reaction fluid silicone rubber formed on the ring-like primer layer, wherein the addition-reaction fluid silicone rubber is combined with the primer layer by vulcanizing the fluid silicone rubber such that a ring-like packing is integrally formed with the connector housing.

Further, the method of manufacturing the waterproof connector housing with the ring-like packing comprises the steps of: manufacturing a connector housing having an engagement frame for receiving a mating connector at a front portion thereof; attaching a primer layer to a wall of an engagement face of the engagement frame; drying the primer to form a ring-like primer layer; putting the connector housing with the primer layer between a male metal mold and a female metal mold having an opening; injecting fluid silicone rubber into the opening of the female metal mold; vulcanizing the fluid silicone rubber to form a ring-like packing in the opening; and removing the male and female metal molds to take out a molded product in which the ring-like packing is integrally formed with the connector housing.

It is further object of the present invention to provide a waterproof connector housing in which electric contacts are not polluted even under high temperature of 100° C. or more, and good waterproofness is obtained, and a ring-like packing is formed easily.

The waterproof connector housing with the above functions comprises: an engagement frame for receiving a mating connector at a front portion thereof; and addition-reaction fluid silicone rubber layer containing 75 ppm/cm$^3$ of low-boiling siloxane, $[(CH_3)_2SiO]_n (n=1-10)$, wherein a ring-like packing is integrally formed with the connector housing by vulcanizing the fluid silicone rubber.

BRIEF DESCRIPTION OF THE DRAWINGS

The present invention will be more apparent from the ensuring description with reference to the accompanying drawing wherein.

DETAILED DESCRIPTION OF PREFERRED EMBODIMENTS

Figure 1A:
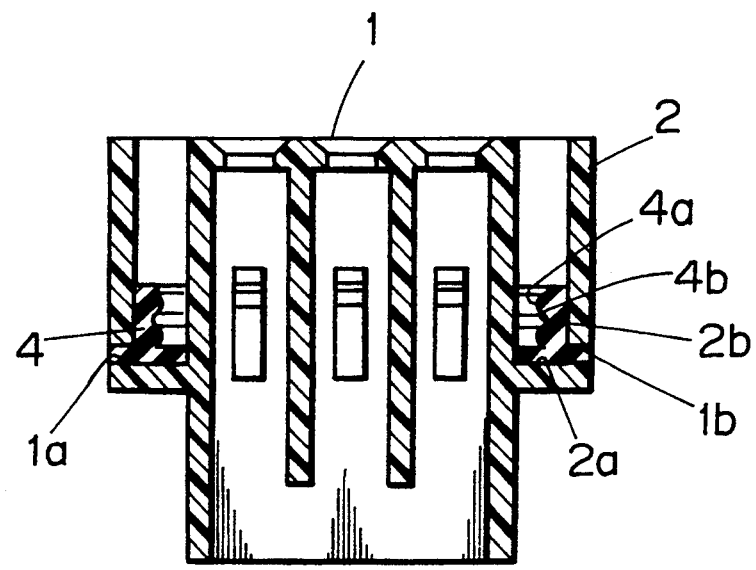
FIG. 1A is a primarily cross-sectional view of a connector housing according to one embodiment of the present invention.
Figure 1B:
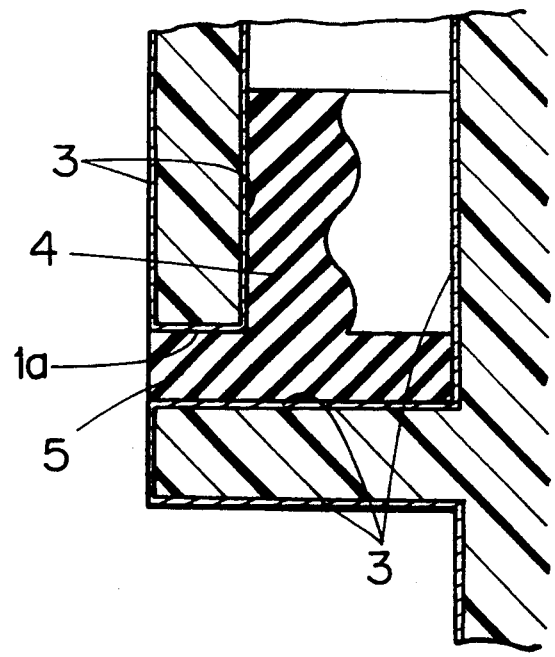
Figure 1B is a partially enlarged view of a ring-like packing according to the embodiment of the present invention.
Figure 5:
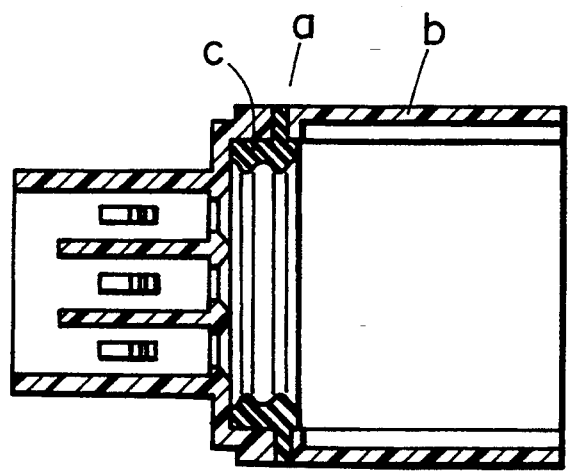
FIG. 5 is a cross-sectional view of a male connector of a conventional waterproof connector.
Figure 6:
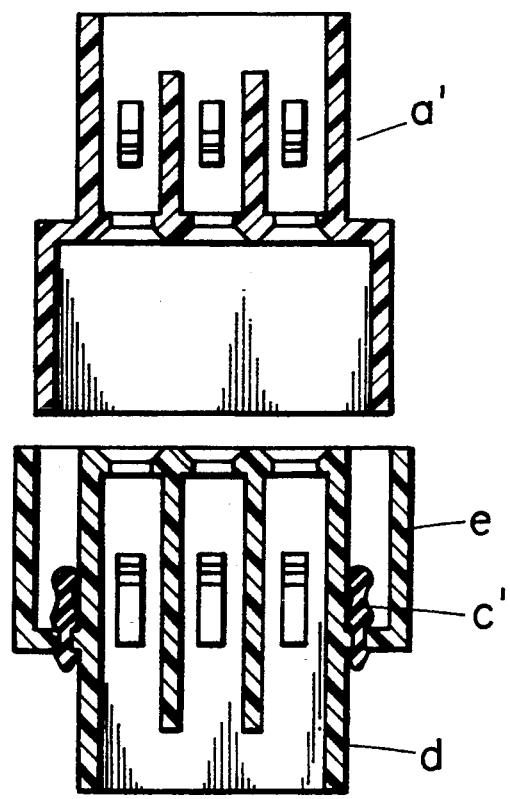
FIG. 6 is a cross-sectional view of the male connector and a female connector of the conventional waterproof connector.

In FIGS. 1A and 1B, denoted 1 is a male connector housing made of synthetic resin and on a periphery thereof is mounted an engagement frame 2 for a mating female connector as illustrated in FIG. 5. The housing 1 is formed of thermoplastic resin such as PBT, 6-nylon and 6,6-nylon, as described above, or thermoset resin such as PF (phenol formaldehyde resin), PI (polyimide resin), and UP (unsaturated polyester resin). The housing may be formed of colored material, but, it is formed with natural color of the resin in this embodiment.

On the inner and outer surfaces of the housing 1 including the engagement frame 2 is formed a primer layer 3, and on the face of the engagement frame 2 on the side of the engagement face, that is, on inner face of a bottom portion 2a and a rising base portion 2b, a ring-like packing made from addition-reaction fluid silicone rubber, or another addition-reaction fluid silicone rubber containing little low-boiling siloxane $[(CH_3)_2SiO]_{1-10}$ is integrally formed with the housing through vulcanization to the primer layer 3. Reference symbols 1a and 1b show injection holes for fluid silicone rubber formed on the housing 1. Projections 5 which are integrally formed with the ring-like packing 4 remains in the holes 1a and 1b. On the inner face of the ring-like packing 4 is formed ring-like uneven face comprising convex portions 4a and concaves portion 4b to improve fitness and adhesive property to the mating connecter.

Since sticky material is not required to be added to the ring-like packing 4 made of addition-reaction fluid silicone rubber or another addition-reaction type fluid silicone rubber with low content of siloxane to improve waterproofness as added to conventional packing, there is no problem in which the packing sticks on the metal mold or worrisome work for surface treatment such as fluorine coating to the mold is required to avoid the problem. Further, since the packing is integral with the housing 1, work for attaching the packing to the housing is unnecessary and there is no possibility that the packing falls off, which promises secure waterproofness. Moreover, since secondary vulcanization is not required at the molding process as described above, there is no possibility of the deformation of the housing.

Next, the method of manufacturing the housing with the ring-like packing 4 will be explained. First, the housing 1 as a plastic form is immersed in a primer solvent for the fluid silicone rubber to attach the primer to the inner and outer surfaces of the housing including the engagement frame 2. After taken out of the primer solvent, the housing is left under the normal temperature and humidity for 40 to 50 hours to form the above primer layer 3. In order to form only the ring-like packing 4, it is sufficient to attach the primer layer 3 to the inner wall of the bottom portion 2a and the rising base portion 2b, but, the housing may be immersed in the primer solvent for easy operation.

The primer solvent used for the present invention contains organopolysiloxane shown by formula (1) as a major component and contains aliphatic hydrocarbon such as n-hexane and isooctane as solvent or condensation catalytic substance.

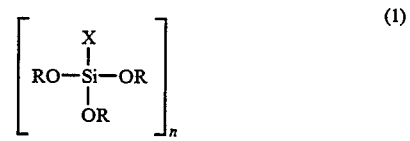

In the above formula, X shows unsaturated hydrocarbon with carbon number 2-4, and R an alkyl group with carbon number 1-5. Therefore, an article on the market, for example, DY39-067 primer made by Dow-Corning Toray Silicone Co., Ltd. may be used as it is. In case that the housing 1 is colored, pigment is micro-dispersed in the above primer solvent. As the pigment, red oxide (brown), ultramarine blue pigment (blue) is used.

The housing 1 immersed in the primer solvent is taken out of the solvent and is dried under the normal temperature and humidity. As a result, hydrolyzing and condensation of the organopolysiloxane are initiated as described in formula 1 due to the humidity in the air to form a stable primer layer 3. When the pigment is mixed to the primer solvent in advance, the housing 1 is colored with a desired color simultaneously with the formation of the primer layer. The coloring is stable due to the condensation of the primer so that there is no possibility of peeling or browning, permitting the operation to be performed with ease.

Figure 2A:
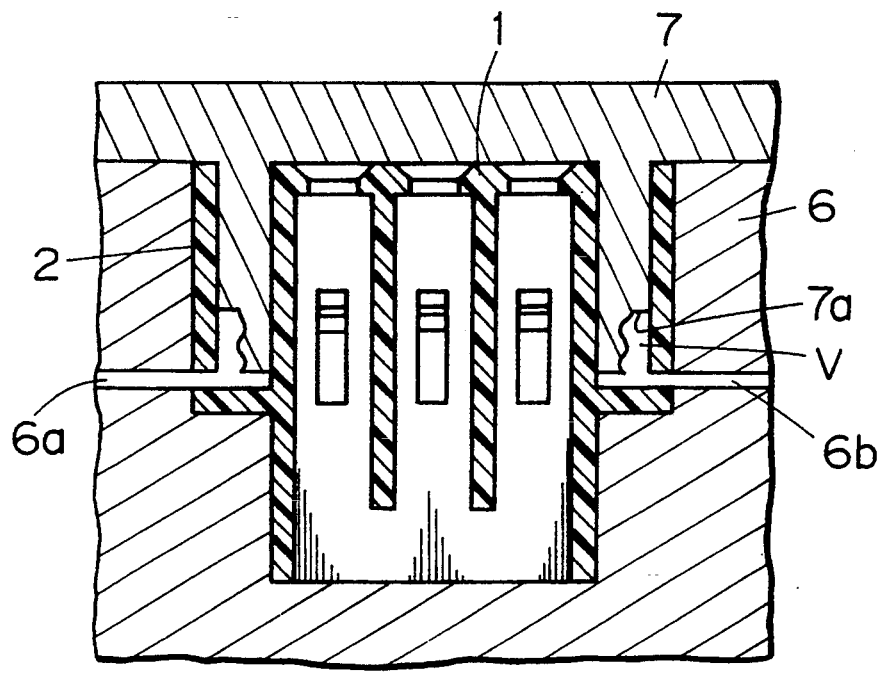
FIG. 2A is a drawing for showing the condition in which a connector housing is put between metal molds in a molding process of the connector housing according to the present invention.

Next, the housing 1 with the primer layer 3 as illustrated in FIG. 2A is put between a female metal mold 6 and a male metal mold 7. At an end of the male metal mold is provided a ring-like concave portion 7a to form an opening V corresponding to the ring-like packing 4. The female metal mold 6 is provided with an inlet 6a and an outlet for the fluid silicone rubber (raw rubber) at a position where the inlet 1a and outlet 1b for the fluid silicone rubber are in communication with each other. The temperature is set in advance between 80° C. and 150° C., preferably, between 110° C. and 130° C.

Then, the fluid silicone rubber is injected into the portion between male and female metal molds 6 and 7 from the inlet 6a and is vulcanized at a predetermined conditions to form the ring-like packing 4 so as to be integral with the housing 1 simultaneously with the adhesion to the primer layer 3.

As the fluid silicone rubber, addition-reaction silicone rubber, particularly, two-fluid-mixed-type low-temperature high-speed addition-reaction type fluid silicone rubber of oil-breed type is used. The addition-reaction silicone rubber comprises liquids A and B. The liquid A contains organopolysiloxane (hereinafter called as "vinyl polymer") shown by formula (2) as major component.

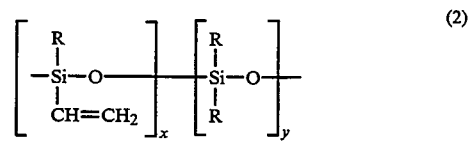

In the formula (2), R shows methyl group or phenyl group.

The liquid B contains organopolysiloxane (hereinafter called as "hydrogen polymer") shown by formula (3) as major component.

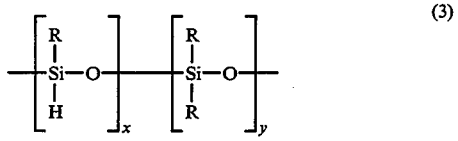

(3)

In the formula (3), R shows methyl group or phenyl group.

The liquids A and B each contains a small amount of filler and additives such as heat-resistant agent. Further, the liquid A is mixed with platinum catalytic substance for crosslinkage of the vinyl polymer and hydrogen polymer.

Figure 3:
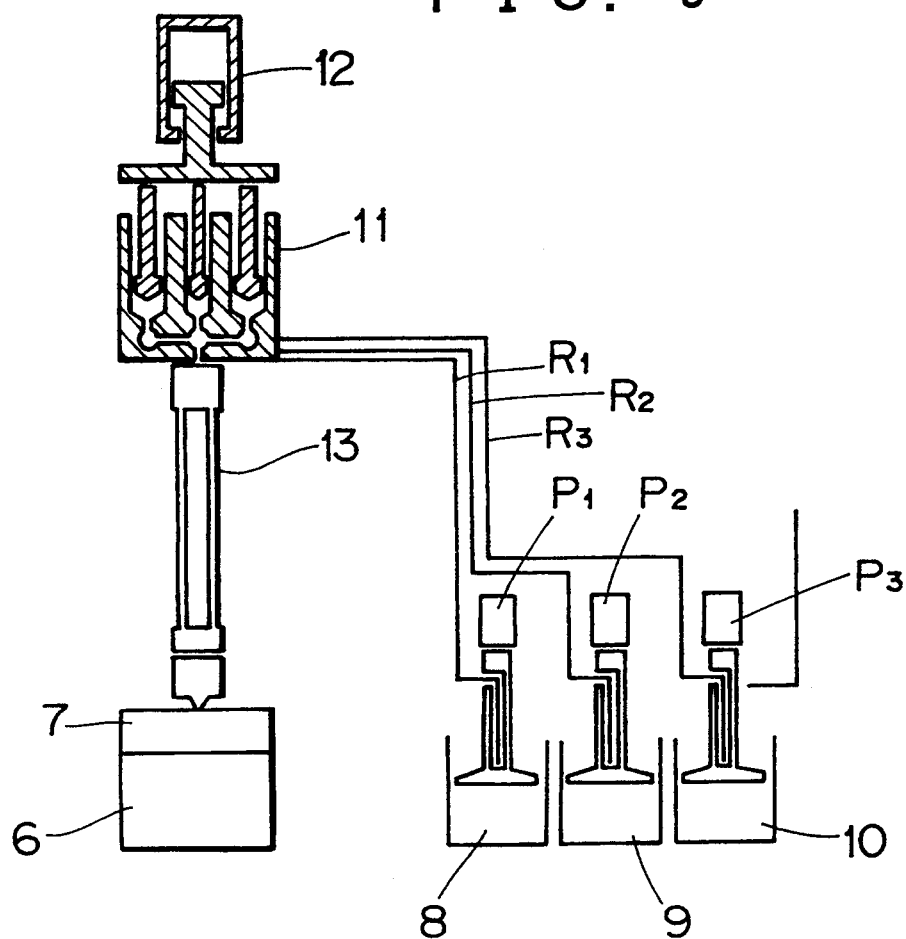
FIG. 3 is a drawing for explaining one embodiment of a waterproof connector housing manufacturing system according to the present invention.

FIG. 3 is a schematic drawing showing equipment For manufacturing the connector housing according to the present invention. In the figure, denoted 8 is a storage vessel for the liquid A, 9 a storage vessel for liquid C described below, and 10 a storage vessel for the liquid B. The liquids A and B are transported to a measuring unit by way of pumps P1 and P2 and transportation lines R1 and R2 so as to be measured separately and are fed to a mixing unit 13 through an injection apparatus 12, where the liquids A and B are forced to be mixed with each other. Then, the mixed liquid is injected into the male and female metal molds 6 and 7 as shown in FIG. 2A.

The temperature of vulcanization for the mixed fluid silicone rubber is adjusted between 80° C. and 150° C., preferably, between 110° C. and 130° C. When the temperature rises higher than 150° C., the housing 1 as a parent body deforms due to the high temperature. Material to be vulcanized at a temperature below 80° C. will be vulcanized even at normal temperature, which shows poor heat stability. The time for the vulcanization is set to 10 seconds to 100 seconds, preferably, 30 seconds to 90 seconds. When the vulcanization time is too short, the material is apt to be vulcanized under normal temperature, resulting in poor stability. On the other hand, longer vulcanization time may cause the housing to be deformed. Further, the viscosity of the liquids A and B is adjusted to be between 300–8,000 poise, preferably, between 700–5,000 poise, When the viscosity is too low, burr is apt to be generated at the molding and higher viscosity may cause the housing to be deformed due to injection pressure. The injection pressure is normally set to be between 5 kg/cm² and 50 kg/cm².

Figure 2B:
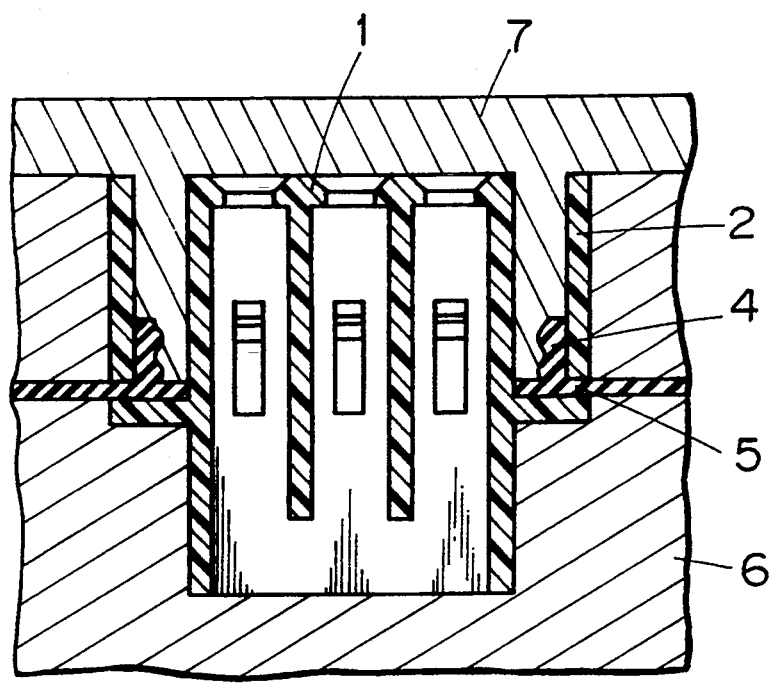
FIG. 2B is a schematic cross-sectional view of the condition in which the ring-like packing is molded in the molding process according to the present invention.

The primer and the housing are combined with each other due to hydrogen binding between —OH groups on the surface of the housing, on which the fluid silicone rubber is attached, and —OH groups on the primer layer through the above primer drying process and vulcanization process. Meanwhile, the fluid silicone rubber and the primer are combined with each other due to the addition-reaction between SiH group in the fluid silicone rubber and vinyl group in the primer. As a result, the ring-like packing 4 is formed on the housing 1 as illustrated in FIG. 2B.

Finally, the male and female metal molds 6 and 7 are removed to take out a molded product in which the ring-like packing 4 is integrally formed with the housing 1. The formation of the ring-like packing 4 under the conditions of the above vulcanization and the bonding is not attended with the deformation of the housing and the generation of the burr. That is, the ring-like packing is easily molded with good productivity and shows good waterproofness.

When the ring-like packing 4 is colored, the liquids A and B are injected after mixed with the liquid C. The liquid C is obtained by dispersing a pigment into silicone oil. Addition of the silicone oil to the liquids A and B may cause the oil to be separated from the liquids A and B, resulting in defective moldings. However, this problem can be overcome by adding the silicone oil immediately before the injection molding. Oil content is easily adjusted by changing the quantity of the liquid C added to the liquids A and B, for example, 5–30% by volume of the liquid C, preferably, 10–20% by volume, to 100% by volume of the liquid A and 100% by volume of the liquid B, which permits the ring-like packing to be colored with desired color and the oil to be spread on the surface of the packing.

The liquid C is transported from the storage vessel 9 to the measuring unit 11 by way of the pump P2 and the transportation line R2 as show in FIG. 3 and the quantity thereof is measured. Then, the liquid C is mixed with the liquids A and B and is injected to form a molded object. The molded object is then vulcanized according the condition described above so that the ring-like packing with the desired color is integrally formed with the housing.

In the above embodiment, the explanation is made for a method of forming the primer layer 3 on the housing 1 prior to the formation of the ring-like packing 4 as shown in FIGS. 1 and 2. However, it is possible to omit the formation of the primer layer. In such a case, for example, the projection described in FIG. 1 is preferably formed on outer periphery of the packing radially to prevent the separation of the ring-like packing from the housing.

The effect of connector terminals to insulation resistance are examined when a rubber stopper and the ring-like packing, which is integrally formed with the housing, are made of normal oil-containing fluid silicone rubber or fluid silicone rubber without low-boiling material and are used for a 6-pole connector.

Samples used for the above test are as follows:
  a rubber stopper; individual oil-containing rubber stopper for one-pole connector, and
  a packing; oil-containing packing for 6-pole connector.

Table 1 shows material and condition of the vulcanization. In the table, reference symbols $D_4$ to $D_{10}$ show low-boiling siloxaneoligomer described by formula, $[(CH_3)_2 SiO]_n (n=4-10)$.

TABLE 1

| NO. | Material | 1st vulcanization | 2nd vulcanization | $D_4$–$D_{10}$ content |
|---|---|---|---|---|
| 1 | Millable-Type Oil-containing silicone rubber | 170° C. × 5 hrs | 200° C. × 2 hrs | 4 ppm |
| 2 | Oil-containing silicone rubber A | 130° C. × 1 hr | Not applicable | 226 ppm |
| 3 | Oil-containing silicone rubber B | 130° C. × 1 hr | Not applicable | 104 ppm |

TABLE 1-continued

| NO. | Material | 1st vulcanization | 2nd vulcanization | $D_4$–$D_{10}$ content |
| --- | --- | --- | --- | --- |
| 4 | Oil-containing silicone rubber C | 130° C. × 1 hr | Not applicable | 33 ppm |

Figure 4:
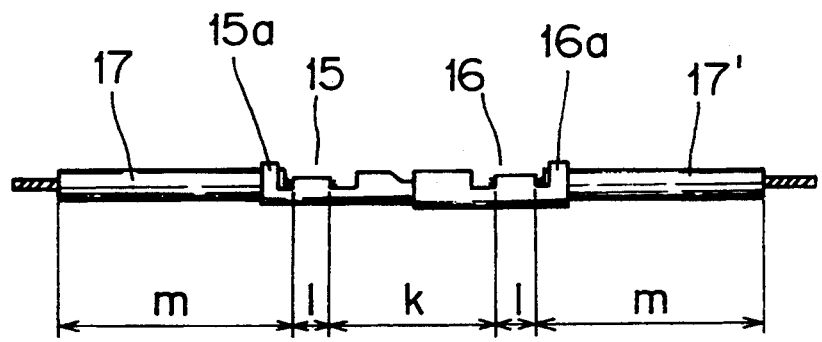
FIG. 4 is a drawing for explaining a method of measuring voltage drop to examine the effect of the present invention.

The material Nos. 1 to 4 in Table 1 are used as samples for connectors, which are sustained in a constant temperature bath of 120° C. for 1,000 hours. After the connectors are taken out of the bath, the voltage drop of the connectors are measured to examine the effect to the terminals. The measuring method is that 20 mV of released voltage and 10 mA of current are applied to both ends of a wire 17 cramped at a male terminal 15 and a wire 17' cramped at a female terminal 16 as shown in FIG. 4 and a voltage drop is measured at a point 200 mm far from the cramped portions 15a and 16a of the wires. Then, contact resistance is obtained by subtracting wire resistance from total resistance.

The test result is described in Tables 2 and 3.

In Table 2, materials tested are all new materials and ten samples for each material are tested.

Further, in Table 3, materials tested are all tested after being kept at 120° C. for 1,000 hours and ten samples for each material are tested.

TABLE 2

| | Voltage Drop (mΩ) | | |
| --- | --- | --- | --- |
| | Ave. | Max. | Min. |
| Material 1 | 0.75 | 0.86 | 0.62 |
| Material 2 | 0.76 | 0.89 | 0.64 |
| Material 3 | 0.78 | 0.89 | 0.64 |
| Material 4 | 0.80 | 0.90 | 0.69 |

TABLE 3

| | Voltage Drop (mΩ) | | |
| --- | --- | --- | --- |
| | Ave. | Max. | Min. |
| Material 1 | 1.16 | 1.33 | 1.08 |
| Material 2 | 11.54 | 12.37 | 9.76 |
| Material 3 | 7.23 | 7.64 | 6.39 |
| Material 4 | 1.34 | 1.49 | 1.30 |

The test results show that of materials 2 to 4 in Tables 2 and 3, Material No. 4 shows the greatest voltage drop, whereas Material No. 4 of materials 2 to 4, shows the least voltage drop. As can be seen in Table 1, of materials 2 to 4, material 4 contains the least low-boiling siloxane.

As described above, the ring-like packing disposed in the engagement frame of the connector housing according to the present invention is integrally formed with the housing by vulcanizing the addition-reaction fluid silicone rubber which contains 75 ppm/cm³ of low-boiling siloxane, [(CH₃)₂SiO]₁₋₁₀. Therefore, it is unnecessary to carry out the worrisome work in which the ring-like packings are attached to the housing one by one and secure waterproofness is obtained. Moreover, at the formation of the packing, it is unnecessary to add sticky material to the fluid silicone rubber separately, which promises easy molding operation since the packing does not stick to the metal mold as occurred in the conventional method, resulting in improved productivity of the connector housing. In addition, secondary vulcanization is not required in the present method, which prevents the housing from being deformed and products with good heat stability are obtained.

What is claimed is:

1. A waterproof connector housing comprising:
   an engagement frame for receiving a mating connector at a front portion thereof;
   an annular primer layer formed on a wall of at least an engagement face of said engagement frame; and
   an addition-reaction fluid silicone rubber formed on said annular primer layer,
   wherein said addition-reaction fluid silicone rubber is combined with said primer layer by vulcanizing the fluid silicone rubber such that a ring-like packing is integrally formed with the connector housing.

2. A waterproof connector housing comprising:
   an engagement frame for receiving a mating connector at a front portion thereof;
   an annular primer layer formed on a wall of at least an engagement face of said engagement frame; and
   an addition-reaction fluid silicone rubber layer containing 75 ppm/cm³ of low-boiling siloxane, $\{(CH_3)_2 SiO\}_n$ (n=1−10),
   wherein an annular packing is integrally formed with the connector housing by said fluid silicone rubber.

3. A waterproof connector housing as claimed in claim 1 or 2, wherein said primer layer contains organopolysiloxane shown by formula (1) below as a major component and contains aliphatic hydrocarbon as solvent and condensation catalytic substance:

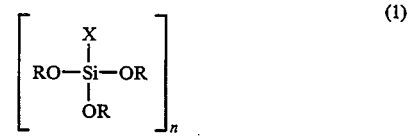
(1)

where X shows unsaturated hydrocarbon with carbon number 2–4, and R an alkyl group with carbon number 1–5.

4. A waterproof connector housing as claimed in claim 1 or 2, wherein said addition-reaction fluid silicone rubber layer comprises first liquid which contains organopolysiloxane shown by formula (2) below as major component, and second liquid which contains organopolysiloxane shown by formula (3) below as major component:

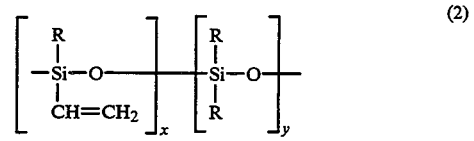
(2)

where R shows methyl group or phenyl group,

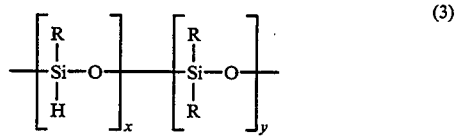
(3)

where R shows methyl group or phenyl group.

5. A waterproof connector housing as claimed in claim 4, wherein said first liquid contains: a filler; heat-resistant agent; and platinum catalytic substance for crosslinkage of said organopolysiloxane shown by said formulas (2) and (3).

6. A waterproof connector housing as claimed in claim 4, wherein said second liquid contains: a filler; and heat-resistant agent.

7. A waterproof connector housing as claimed in claim 4, wherein third liquid comprising silicone oil and pigment, which is dispersed in said silicone oil, is added to said first and second liquid and resultant liquid is injected to form said addition-reaction fluid silicone rubber layer.

8. A waterproof connector housing as claimed in claim 7, wherein 5% to 30% by volume of said third liquid is added to 100% by volume of said first liquid and 100% by volume of said second liquid.

9. A waterproof connector housing as claimed in claim 7, wherein 10% to 20% by volume of said third liquid is added to 100% by volume of said first liquid and 100% by volume of said second liquid.

10. A method of manufacturing a waterproof connector housing comprising the steps of:
    manufacturing a connector housing having an engagement frame for receiving a mating connector at a front portion thereof;
    applying a primer layer to a wall of an engagement face of said engagement frame;
    drying said primer to form an annular primer layer;
    putting the connector housing with said primer layer between a male metal mold and a female metal mold having an opening;
    injecting fluid silicone rubber into said opening of the female metal mold;
    vulcanizing said fluid silicone rubber to form an annular packing in the opening; and
    removing said male and female metal molds to take out a molded product in which the annular packing is integrally formed with the connector housing.

11. A method of manufacturing a waterproof connector housing as claimed in claim 10, wherein said step of attaching said primer layer to the wall of the engagement face of said engagement frame comprising the steps of immersing said housing in primer solvent; taking the housing out of the primer solvent; and leaving the housing under the normal temperature and humidity.

12. A method of manufacturing a waterproof connector housing as claimed in claim 11, wherein said primer solvent contains organopolysiloxane shown by formula (1) below as a major component and contains aliphatic hydrocarbon as solvent and condensation catalytic substance:

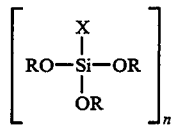

where X shows unsaturated hydrocarbon with carbon number 2-4, and R an alkyl group with carbon number 1-5.

13. A method of manufacturing a waterproof connector housing as claimed in claim 10, wherein said addition-reaction fluid silicone rubber layer comprises first liquid which contains organopolysiloxane shown by formula (2) as major component, and second liquid which contains organopolysiloxane shown by formula (3) as major component:

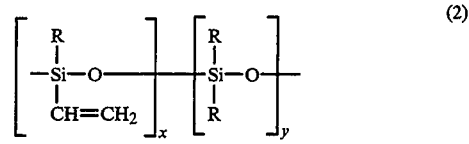

where R shows methyl group or phenyl group,

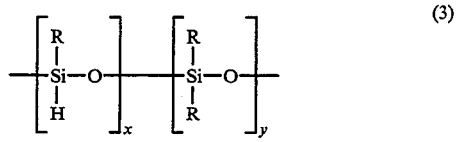

where R shows methyl group or phenyl group.

14. A method of manufacturing a waterproof connector housing as claimed in claim 13, wherein said first liquid contains: filler; heat-resistant agent; and platinum catalytic substance for crosslinkage of said organopolysiloxane shown by said formulas (2) and (3).

15. A method of manufacturing a waterproof connector housing as claimed in claim 13, wherein said second liquid contains: a filler; and heat-resistant agent.

16. A method of manufacturing a waterproof connector housing as claimed in claim 13, wherein third liquid comprising silicone oil and pigment, which is dispersed in said silicone oil, is added to said first and second liquid and resultant liquid is injected to form said addition-reaction fluid silicone rubber layer.

17. A method of manufacturing a waterproof connector housing as claimed in claim 13, wherein 5% to 30% by volume of said third liquid is added to 100% by volume of said first liquid and 100% by volume of said second liquid.

18. A method of manufacturing a waterproof connector housing as claimed in claim 13, wherein 10% to 20% by volume of said third liquid is added to 100% by volume of said first liquid and 100% by volume of said second liquid.

19. A method of manufacturing a waterproof connector housing as claimed in claim 10, wherein temperature of said male and female metal molds before injecting said fluid silicone rubber is set from 80° C. to 150° C.

20. A method of manufacturing a waterproof connector housing as claimed in claim 10, wherein temperature of said male and female metal molds during injection of said fluid silicone rubber is set from 110° C. to 130° C.

21. A method of manufacturing a waterproof connector housing as claimed in claim 10, wherein temperature for vulcanizing said fluid silicone rubber is set from 80° C. to 150° C.

22. A method of manufacturing a waterproof connector housing as claimed in claim 10, wherein temperature for vulcanizing said fluid silicone rubber is set from 110° C. to 130° C.

23. A method of manufacturing a waterproof connector housing as claimed in claim 10, wherein time for vulcanizing said fluid silicone rubber is set from 10 seconds to 120 seconds.

24. A method of manufacturing a waterproof connector housing as claimed in claim 10, wherein time for vulcanizing said fluid silicone rubber is set from 30 seconds to 90 seconds.

25. A method of manufacturing a waterproof connector housing as claimed in claim 13, wherein viscosity of said first liquid is between 300 poise and 8,000 poise.

26. A method of manufacturing a waterproof connector housing as claimed in claim 13, wherein viscosity of said first liquid is between 700 poise and 5,000 poise.

27. A method of manufacturing a waterproof connector housing as claimed in claim 13, wherein viscosity of said second liquid is between 300 poise and 8,000 poise.

28. A method of manufacturing a waterproof connector housing as claimed in claim 13, wherein viscosity of said second liquid is between 700 poise and 5,000 poise.

29. A method of manufacturing a waterproof connector housing as claimed in claim 13, wherein pressure for injecting said fluid silicone rubber is set between 5 kg/cm$^2$ and 50 kg/cm$^2$.

30. A waterproof connector housing as claimed in claim 1, wherein said engagement frame is made of unreinforced thermoplastic.

31. A waterproof connector housing as claimed in claim 30, wherein said unreinforced thermoplastic engagement frame comprises PBT, 6-nylon or 6,6-nylon.

32. A method of manufacturing a waterproof connector housing as claimed in claim 10, wherein said engagement frame is made of unreinforced thermoplastic.

33. A method of manufacturing a waterproof connector housing as claimed in claim 32, wherein said unreinforced thermoplastic engagement frame comprises PBT, 6-nylon or 6,6-nylon.

* * * * *